United States Patent [19]
Hirs

[11] 3,731,803
[45] May 8, 1973

[54] METHOD OF OPERATING A FILTER BED OF FINE GRANULAR MEDIA

[75] Inventor: Gene Hirs, Detroit, Mich.

[73] Assignee: Hydromation Filter Company, Livonia, Mich.

[22] Filed: Nov. 2, 1970

[21] Appl. No.: 85,857

[52] U.S. Cl..................................210/80, 210/279
[51] Int. Cl. ..............................................B01d 23/24
[58] Field of Search..........................210/80, 82, 274, 210/275, 277, 278, 279

[56] References Cited

UNITED STATES PATENTS

| | | | |
|---|---|---|---|
| 2,855,364 | 10/1958 | Roberts | 210/275 X |
| 3,381,823 | 5/1968 | Nash | 210/279 |
| 3,557,955 | 1/1971 | Hirs et al. | 210/80 |

Primary Examiner—Samih N. Zaharna
Attorney—Cullen, Settle, Sloman & Cantor

[57] ABSTRACT

This invention provides a method of and apparatus for the deep bed filtration of a liquid containing fine particles (generally on the order of less than 0.005 inches) to obtain an effluent of exceptional clarity. It has been discovered that filtration to this degree of clarity requires a compacted filter medium bed and that this bed compactness must be preserved during rejuevenation of the bed to avoid the dispersal of previously removed dirt particles throughout the filter medium. In this invention, the rejuevenation of the bed is carried out by the reverse flow of liquid through the bed at a flow rate at least twice the flow rate during filtration and without disturbing the configuration or compactness of the bed.

5 Claims, 7 Drawing Figures

Patented May 8, 1973

INVENTOR.
GENE HIRS.
BY
CULLEN, SETTLE, SLOMAN & CANTOR
ATT'YS.

Patented May 8, 1973

INVENTOR.
GENE HIRS.
BY
CULLEN, SETTLE, SLOMAN & CANTOR
ATT'YS.

Patented May 8, 1973

INVENTOR.
GENE HIRS.
BY
CULLEN, SETTLE, SLOMAN & CANTOR.
ATT'YS.

INVENTOR.
GENE HIRS.
BY
CULLEN, SETTLE, SLOMAN & CANTOR.
ATT'YS.

METHOD OF OPERATING A FILTER BED OF FINE GRANULAR MEDIA

BACKGROUND OF THE INVENTION

The prior art method of deep bed filtration using granular filter media generally comprises a filtration cycle during which the dirty liquid is filtered by flow downwardly through a body of filter medium and a cleaning cycle during which entrapped dirt particles are removed from the filter medium by expanding the filter bed one or more times with a scrubbing or agitation of the filter medium granules to aid in removing entrapped dirt. A different method of filtration comprises filtration upward through a slightly expanded bed of filter medium, with greater expansion during the cleansing cycle to remove entrapped dirt particles. Yet another method of filtration of the class of granular filter media, or deep bed filters, consists of filtration upward through an expanded body of filter media and with a downward flow cleansing cycle.

Of the many combinations of these basic methods of filtration, all make use of an expanded filter bed either during the filtration cycle or cleansing cycle, or both, which results in residual non-removed dirt particles being randomly dispersed throughout the filter medium. Of course, some of these randomly dispersed dirt particles are flushed to and through the clean water outlet when filtration is resumed. This flushing of previously entrapped dirt particles to the filtrate side of the medium is commonly referred to as "breakthrough" and generally is simply tolerated in conventional deep bed filtration systems.

The expanded filter beds and scrubbing or agitation associated with prior methods of filtration are adequate for most conventional filtration needs, such as for drinking water and some waste water treatment. But there exists now an ever increasing need for methods of filtration which will continually produce an ultra-pure filtrate. Such clarity demands occur in power plants, in the manufacture of pharmaceuticals, in the manufacture of certain high grade chemicals, and in the manufacture of various yarns. The passage of residual dirt particles to and through the outlet upon the resumption of filtration cannot be tolerated where high clarity filtrate is required.

Considering, particularly, the requirements of nuclear power plants, the clarity of recirculated steam condensate, fuel pool water, and cooling jacket water must be on the order of less than five parts of particulate contaminants per billion parts of water. These contaminants are extremely fine particles, being produced as a result of corrosion and erosion of equipment surfaces in contact with the water. The ultra-fine clarity for recirculated steam condensate is necessary to prevent an unwanted buildup of foreign matter in heat exchangers and to reduce the erosion of steam turbine blades. In cooling jackets, such clarity is required to reduce erosion of fuel cells and to prevent the formation of deposits of dirt which are highly radioactive and difficult to remove. In fuel pools, it is necessary to provide unobstructed vision through at least thirty feet of water and to eliminate particulate matter which will become radio-active.

GENERAL DESCRIPTION OF THE INVENTION

The present invention proposes a method of filtering wherein the body of granular filter media is held in a compact state and in substantially the same configuration during both filtration and cleansing cycles, with flow rate of the cleansing liquid being generally reverse to and at least twice as great as the filtration flow rate. Further, the present invention is limited to use of a finely divided, granular filter media, e.g., media particles of about 50 mesh size for a material like polyvinyl chloride and about 100 to 300 mesh size for aluminum oxide. Also, the method of the present invention is generally limited to the filtration of liquid containing dirt particles of less than 0.005 inch in maximum dimension.

With the maintenance of a compact filter medium during both the filtration and cleansing cycle and with cleansing flow being reverse to filter flow, a very high degree of filtrate clarity is attainable without dispersing dirt particles throughout the body of filter media. Thus, the present invention permits repeated filtration and cleansing cycles with the media remaining firmly in situ and with no start-up breakthrough of dirt particles upon the resumption of the filtration cycle.

By way of example, actual tests with a method and apparatus as disclosed herein have repeatedly produced an effluent clarity of water of less than one part per billion, the influent clarity being about 10 parts per million. This 10,000 to 1 reduction in suspended solids was accomplished with 100 to 300 mesh granular aluminum oxide at a filtration flow rate of 10 to 20 gallons per minute per square foot of outlet opening and a cleansing flow of 30 to 60 gallons per minute per square foot of outlet opening.

Clearly, the present invention offers a unique method for use in clarifying nuclear power plant steam condensate or other critical liquids.

The present invention, because the body of filter medium is always in situ, does not involve the movement or handling of the filter medium which may be very heavy and abrasive and difficult to handle, as for example, where the medium is aluminum oxide, or where the medium interlocks and does not easily flow, as with crushed polyethylene. Further, there is advantage to not handling any material subject to radioactivity.

It should be noted, however, that the limitations of the present invention render it not adaptable to filtration of large particles that tend to become interlocked in the filter media, or to the filtration of oily or greasy or other substances which tend to cause an agglomeration of dirt particles in the filter medium. The limitation to the use of finely divided, granular filter media precludes filtration in situations of surface loading, which can otherwise be overcome by the use of larger filter media and conventional methods of filtration.

Though the principle of the present invention is not fully understood, it has been discovered that, when dealing with such small dirt particles, by reversing and substantially increasing (at least twice) the filter flow rate, while still maintaining a compact filter medium, the dirt particles will be washed from the filter medium back to the influent side of the filter medium. The dirt particles are simple flushed back to or at least toward the inlet side of the filter medium bed. The particles are flushed and moved in a definite, desired direction by a high velocity flow of cleansing liquid moving at a flow rate at least twice that of the flow rate at which the particles were carried into the bed. While the particles may not travel reversly in exactly their entry paths, the increased reverse liquid flow directly to the dirty liquid inlet will prevent the random distribution of any residual dirt particles throughout the body of filter medium and specifically will prevent any movement of such particles toward the outlet for clean liquid.

Figure 1:
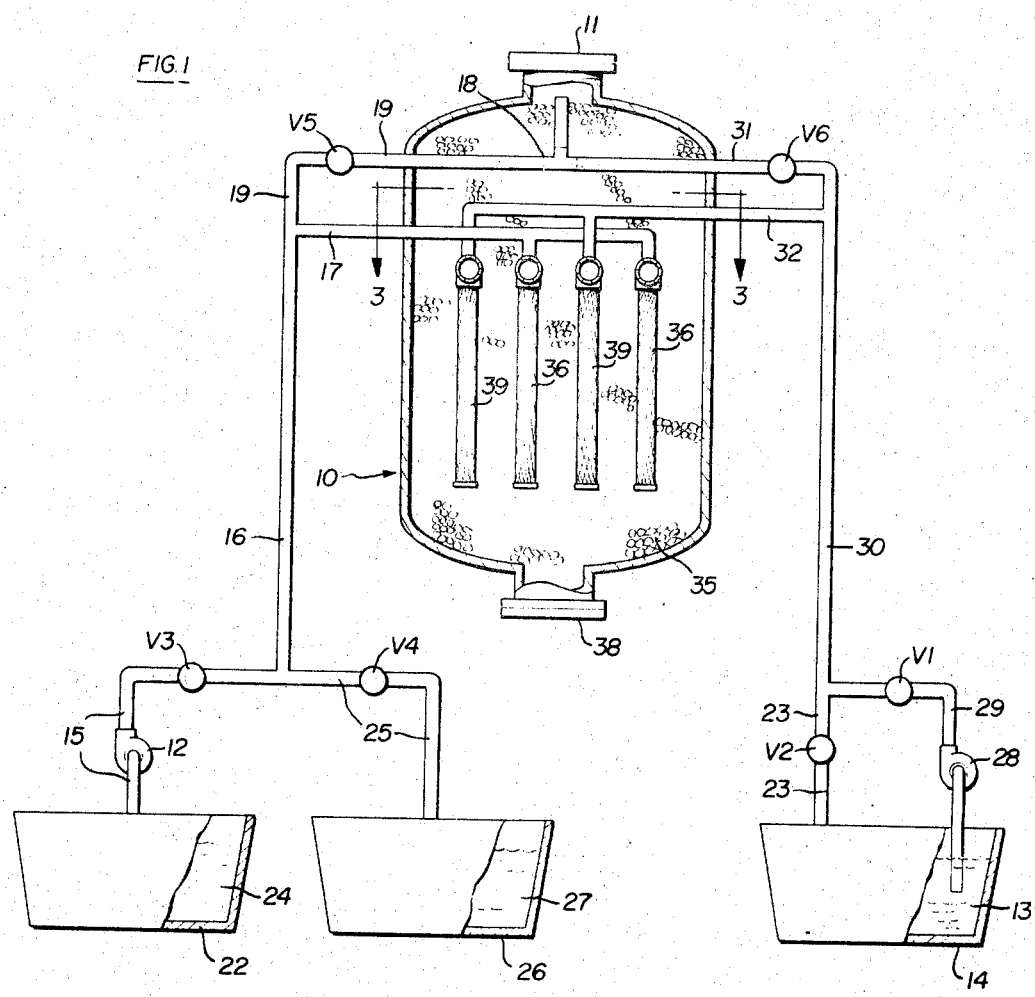
FIG. 1 is a somewhat schematic, elevational view, with parts in section, of one embodiment of the present invention.
Figure 3:
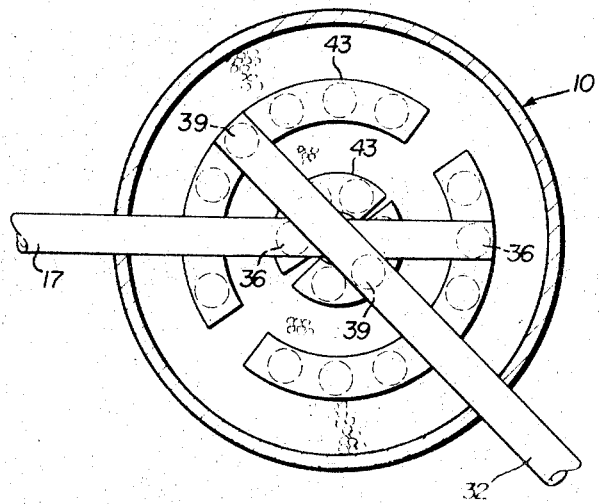
FIG. 3 is a sectional view taken along the plane 3—3 of FIG. 1.
Figures 2, 5:
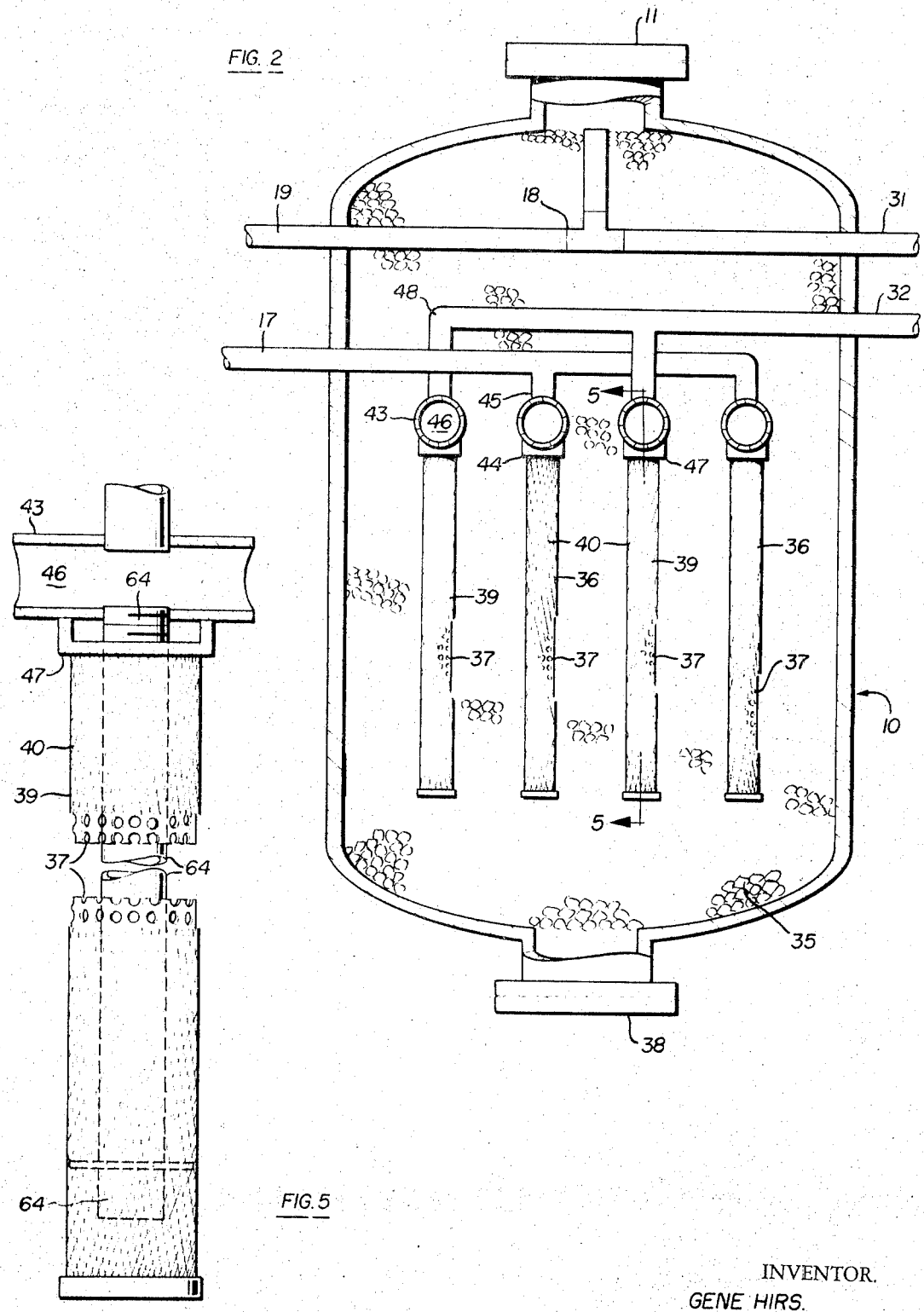
FIG. 2 is an enlarged cross-section view of a portion of the embodiment of FIG. 1.
FIG. 5 is an enlarged sectional view taken along the plane 5—5 of FIG. 2.

In FIGS. 1, 2 and 3, the reference numeral 10 refers to a tank containing filter media 35. The filter media 35 may be any finely divided, granular materials, preferably an organic polymeric material of a size ranging from about 40 to about 80 mesh, for instance, polyethylene or polyvinyl chloride, or a material like aluminum oxide of a size ranging from about 100 to about 300 mesh. Suitable polymeric materials are disclosed in my pending application Ser. No. 696,624, filed in the U.S. Patent Office on Jan. 9, 1968, now U.S. Pat. No. 3,557,955 and suitable alumina materials are disclosed in my pending application Ser. No. 863,920, filed in the U.S. Patent Office on Oct. 6, 1969.

The filter media is placed in tank 10 through port 11 and removed, when necessary, through port 38, or by some other suitable means not shown. While filling the tank with filter media, it may be necessary to employ some means of circulating liquid into tank 10 to ensure compactness of the body of filter media and to filter out fines. This all depends on individual technique and operating requirements and was not illustrated herein to avoid unnecessary complication.

Embedded in the filter medium to depend vertically are a plurality of inlet tubes 36 and outlet tubes 39 radially spaced from one another. These tubes 36 and 39 are substantially identical in structure and, in preferred embodiment, are formed standard pipe sections of stainless steel or other similar material provided with a plurality of perforations 37. Enveloping each of the tubes, 36 and 39, is a stainless steel mesh wire or cloth 40 forming a tight septum against which the filter media will lie.

The inlet tubes 36 communicate with an upper, horizontal manifold inlet pipe 17 projecting radially through the upper cap of tank 10 and generally overlying tubes 36 to be connected thereto through arcuate manifolds 43 and to the inlet line 17. Similarly, manifolds 46, adaptors 47, and connecting pipes 48 interconnect the outlet tubes 39 with the outlet line 32.

Filtration of dirty liquid 24 contained in tank 22 may begin when tank 10 is filled with media 35. Filtration is initiated by closing valves V1, V4 and V6, starting pump 12, and opening valves V3, V5 and V2.

During filtration dirty liquid is drawn from tank 22 into and through the pump 12 and the lines 15 and 16. A portion of this flow, about 10 percent, passes into and through line 19 and inlet tee 18. The flow from inlet tee 18 maintains a top pressure on the filter medium for the purpose of keeping it in a compact state. The remaining 90 per cent of the flow passes into and through line 17 and manifolds 43, into tubes 36, and through perforations 37 and mesh 40.

The dirty liquid from tubes 36 and inlet tee 18 flows through the filter medium at the maximum flow rate permissible without dirt particle breakthrough. This ideal flow rate, best determined empirically, depends on the effluent clarity desired, the average dirt size, type and size of filter media used, and distance between tubes. Generally, the flow rate is directly proportional to the average dirt size, the size of the filter medium and the distance between tubes and inversely proportional to the desired clarity.

From the filter medium, the filtrate or clean liquid 13 flows into tubes 39, through the respective mesh 40 and perforations 37. Clean liquid 13 then flows into and through manifolds 46, connecting pipes 48, lines 32, 30 and 23, and into clean liquid storage tank 14.

The normal flow of dirty liquid into the filter medium and effluent from the filter medium will continue until such time as sufficient dirt particles have become entrapped in the body of filter media to substantially inhibit the flow of liquid therethrough or until such time as the effluent in line 32 is of an intolerable degree of turbidity. Either the increase in resistance to flow of liquid through the filter medium or such increased turbidity may be readily determined and used to determine the necessity for cleansing the filter media. Determination of the start of the cleansing cycle by a use of pressure drop across the filter medium can be accomplished by simple pressure gauges installed in lines 17 and 32, which gauges would sound an alarm, give a visual indication, or even automatically initiate the cleansing cycle at a predetermined pressure differential. Alternatively, a continuous turbidity monitoring system may be installed in the clean outlet or effluent line 32, such a monitoring system would again give an audible or visual alarm, or initiate automatically the cleansing cycle.

Upon initiating the cleansing cycle, valves V3, V5 and V2 are closed and pump 12 is stopped. Pump 28, which operates at a flow rate greater than twice that of pump 12, is started, and valves V1, V6 and V4 are opened.

Clean liquid 13 contained in tank 14 is drawn into and through lines 29 and 30. As in the filtration cycle, about 10 per cent of this flow passes into and through line 31 and inlet tee 18 for the purpose of maintaining a top flow pressure on the filter medium to ensure a filter medium that is in substantially the same compact state and configuration as during filtration. The remaining part of the flow passes into and through line 32, manifolds 46, and tubes 39. The flow from tubes 39 and inlet tee 18 is in a direction reverse to that of filtration flow at a rate greater than twice that of the filtration flow rate, being sufficient to remove entrapped dirt particles from the body of filter media. The dislodged dirt particles, along with the cleansing liquid passing into and through tubes 36, manifolds 43, lines 17, 16 and 25, and into wash waste tank 26.

Actual tests have shown that in some cases a more efficient cleansing operation occurs when the cleansing flow is pulsating or successively started and stopped. This pulsation can be accomplished through opening and closing valve V1 or V4 as required.

Figure 4:
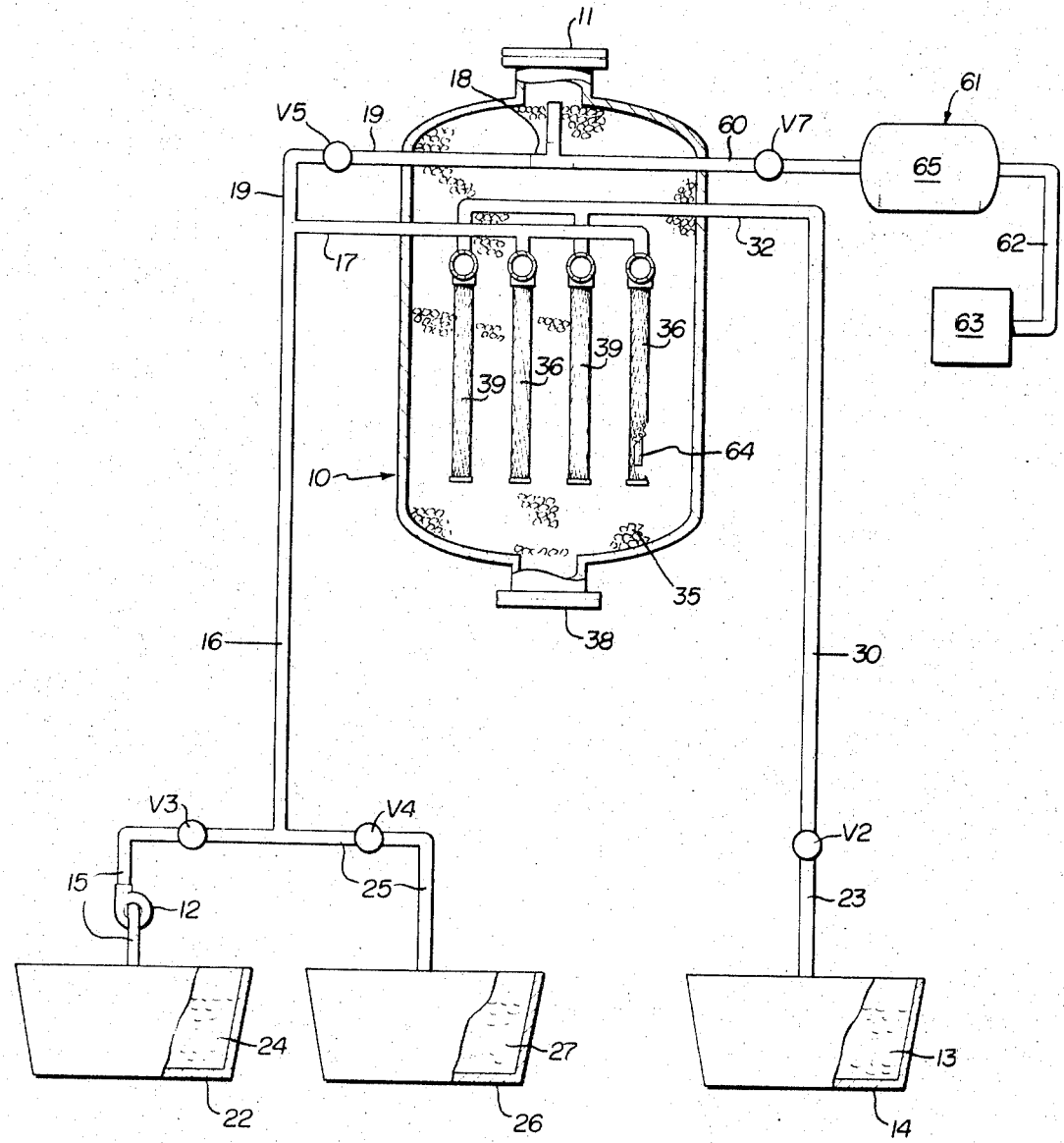
FIG. 4 is a view similar to FIG. 1, but illustrating a somewhat different embodiment of the present invention.

The apparatus of FIGS. 4 and 5 is, in most respects, identical to that of FIGS. 1, 2 and 3, and like numerical designations are intended to be similarly defined. However, the apparatus shown in FIG. 4 does not contain a cleansing cycle pump 28, but rather contains a compressed air tank 61 which stores compressed air 65, or some other suitable gas, for the purpose of inducing the cleansing flow.

In FIG. 4, the outlet tubes 39 are identical to those in FIG. 1, but the inlet tubes 36 of FIG. 4 have non-perforate tubes 64, preferably of stainless steel, placed concentrically within tubes 36 and joined directly to adaptors 44 and connecting pipes 45. There is no direct, open connection between tubes 36 and adapters 44. The length of tubes 64 is the maximum length to permit substantially unrestricted flow into and out of the open lower ends of tubes 64. The open lower ends of tubes 64 necessarily determine the lower level to which the compressed air will blow down the cleansing liquid.

Filtration is carried out as described with respect to the apparatus of FIG. 1, with the exception that dirty liquid 24 passes through tubes 64 before passage through tubes 36. The end of the filtration cycle is likewise determined by effluent turbidity or pressure drop across the filter media.

During the filtration cycle, air compressor 63 simply stores air under pressure in tank 61. The amount of compressed air stored and its pressure will be that necessary to force the cleansing liquid through the filter media at a flow rate substantially greater than (at least twice) that of the filtration flow rate.

The cleansing liquid in this case is the liquid remaining in tank 10 at the end of the filtration cycle. There is, however, no limitation of the present invention as to the type of liquid used to cleanse the filter media. There may be cases, such as with plating solutions, in which it will be desirable to first drain tank 10 of the filtered liquid because ot its value, followed by the cleansing operation with a completely different liquid such as water.

In any event, the cleansing cycle begins by closing valves V2, V3 and V5, and stopping pump 12. Valves V4 and V7 are opened. Compressed air 65 passed into and through line 60 and inlet tee 18 forcing the cleansing liquid in tank 10 downwardly into and through tubes 36, tubes 64, manifolds 43, lines 17, 16 and 25, and into wash waste tank 26. When the compressed air reaches the level of the bottom ends of tubes 64, the air leaks out through tubes 64 thus terminating the cleansing flow.

The force of the compressed air maintains the body of filter media in substantially the same compact state and configuration as during the filtration cycle.

To further remove the entrapped dirt from the filter medium, it may be necessary to fill tank 10 with additional cleansing liquid, in the instant case being dirty liquid, and repeat the blow down with compressed air.

Figures 6, 7:
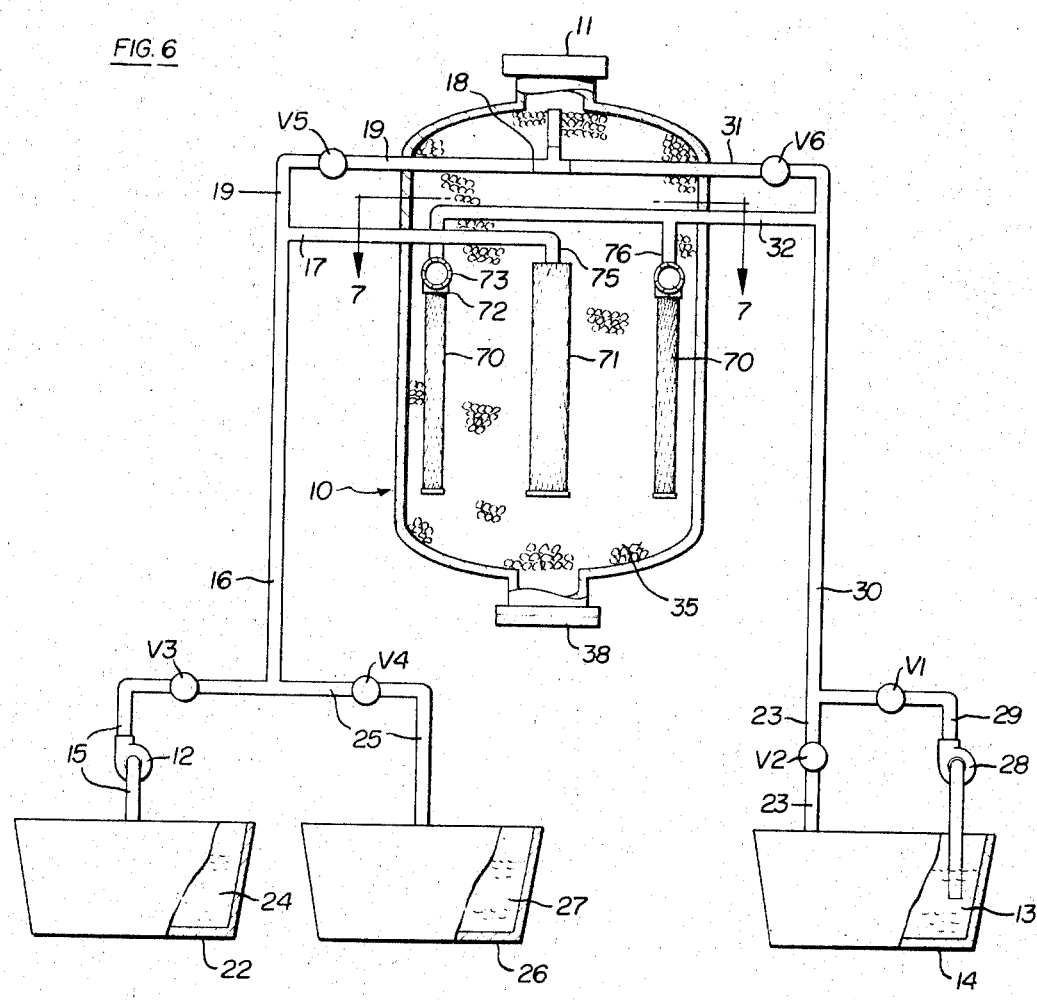
FIG. 6 is a view similar to FIG. 1, but illustrating a modified embodiment of the present invention.
FIG. 7 is a sectional view taken along plane 7—7 of FIG. 6.

A third embodiment of the present invention is shown in FIGS. 6 and 7. This apparatus, also, in many respects is identical to that of FIG. 1, and like numerical designations are intended to be similarly defined.

The configuration and arrangement of inlet and outlet means of the apparatus of FIG. 6 are different from those of the previously described apparatus of FIG. 1. In FIG. 6, there is embedded, preferably in the center of the filter medium to depend vertically, a single inlet tube 71. Also, embedded in the filter medium to depend vertically are a plurality of outlet tubes 70 radially spaced and equidistant from inlet tube 71. Tubes 70 and 71 are identical in structure to tubes 36 and 39, previously described. However, tubes 70 are not necessarily of the same diameter as tube 71.

The inlet tube 71 communicates with the upper inlet pipe 17 through a connecting pipe 75. Outlet tubes 70 communicate with an upper, horizontal outlet pipe 32 to be connected thereto through arcuate manifold 73. Suitable adaptors 72 and connecting pipes 76 join outlet tubes 70 to mainfold 73 and outlet line 32.

The filtration and cleansing cycles are executed in the same manner as with the apparatus of FIG. 1, with the exception that the single inlet tube 71 and different arrangement of outlet tubes 70 create a more uniform flow pattern through the filter media about inlet tube 71. This uniform flow pattern eliminates dead spaces in the filter medium in which dirt particles can build up over a period of many filtration and cleansing cycles, which build-up causes a decrease in total dirt holding capacity of the body of filter media.

The apparatus of FIG. 6 can also be modified slightly to use the air blow down method shown in FIG. 4. In such event, a single non-perforate tube (similar to tube 64) would be placed concentrically within inlet tube 71. Results of tests run using the method of the present invention and apparatus as shown in FIG. 1 are set out below in Table I.

TABLE I

| | Aluminum Oxide Filter Media | Polyvinyl Chloride Filter Media |
|---|---|---|
| Size of filter media granules (U.S. mesh) | 200 to 300 | 50 to 60 |
| Inlet opening area (sq. ft.) | 0.5 | 1.5 |
| Outlet opening area (sq. ft.) | 0.5 | 3.0 |
| Filtration flow rate (G.P.M./sq. ft. of outlet opening | 20 | 20 |
| Cleansing flow rate (G.P.M./sq. ft. of outlet opening) | 80 | 40 |
| Type of dirt | $Fe_2O_3$ | $Fe_3O_4$ + $FE(OH)_3$ |
| Size of dirt particles (microns) | 0.2 to 0.8 | 0.2 to |
| Influent clarity (parts per million) | 10 | 10 $Fe_3O_4$ + 10 $Fe(OH)_3$ |
| Effluent clarity (parts per million) | <0.001 | 2 |

What is claimed is:

1. In a method of operating a deep bed filter having a body of finely divided granular filter media interposed between an inlet opening connected to a source of contaminated liquid and an outlet opening for clean liquid, the steps of (1) filtering by flowing said contaminated liquid from said inlet opening to said outlet opening and through said body of filter media while maintaining the body of filter media in a compact state, and (2) cleansing entrapped dirt particles from said filter media by flowing liquid through the body of filter media (a) at a velocity at least twice the flow velocity during the performance of step (1), and (b) in a direction reverse to the direction of the flow during the performance of step (1), while (c) maintaining the body of filter media in substantially the same configuration and compacted state as during the performance of step (1), so that residual dirt particles are not dispersed throughout the whole body of filter media and such particles are displaced relative to the filter media solely toward said inlet opening.

2. A method as defined in claim 1, wherein the filter media consists essentially of alumina of a size ranging from about 100 to about 300 mesh.

3. A method as defined in claim 1, wherein the filter media is an organic polymeric material of a size ranging from about 40 to about 80 mesh.

4. A method as defined in claim 1, wherein the body of filter media is confined in a tank with one end face of the body spaced from an end wall of the tank, and during the performance of both steps (1) and (2) fluid under pressure is injected into the space between the tank end wall and the body end face to maintain said body in a constant, compacted state.

5. A method as defined in claim 4, wherein the fluid under pressure is liquid during the performance of step (1) and a gas during the performance of step (2).

* * * * *